United States Patent

[11] 3,592,412

| | | |
|---|---|---|
| [72] | Inventor | Edward W. Glatfelter<br>Newtown Square, Pa. |
| [21] | Appl. No. | 863,721 |
| [22] | Filed | Oct. 3, 1969 |
| [45] | Patented | July 13, 1971 |
| [73] | Assignee | The Boeing Company<br>Seattle, Wash. |

[54] CONVERTIBLE AIRCRAFT
15 Claims, 10 Drawing Figs.

[52] U.S. Cl. .................................................. 244/7, 416/142
[51] Int. Cl. .................................................. B64c 27/22
[50] Field of Search .................................................. 244/7, 2, 58, 56, 66; 416/142

[56] References Cited
UNITED STATES PATENTS

| | | | |
|---|---|---|---|
| 2,678,785 | 5/1954 | Graham | 416/142 X |
| 2,684,213 | 7/1954 | Robert et al. | 416/142 X |
| 2,702,168 | 2/1955 | Platt | 244/7 |
| 3,089,666 | 5/1963 | Quenzler | 244/7 |
| 3,254,725 | 6/1966 | Higgins | 244/7 X |
| 3,404,852 | 10/1968 | Samhell et al. | 244/7 |

*Primary Examiner*—Milton Buchler
*Assistant Examiner*—Carl A. Rutledge
*Attorneys*—Albert W. Hilburger and John D. Fischer ABSTRACT: A rotor hub assembly for aircraft adapted to hover, climb, and descent like a helicopter, yet also adapted to cruise in the manner of a conventional fixed-wing airplane. The rotor hub assembly includes rotor blades which are movable between extended, operational positions during the hover mode and retracted, inoperative positions during the cruise mode such that they are flush with outer surfaces of their associated nacelles mounted at outer extremities of fixed wings. Upon commencement of the folding sequence, the blades assume feathered positions. A scheduling mechanism controls rotation of the blades about their pitch axes as they are folded and maintains the blades in their feathered positions until they nearly retracted, at which time the blades are rapidly rotated about their pitch axes to a substantially flat pitch as they settle into associated cavities provided in the nacelles.

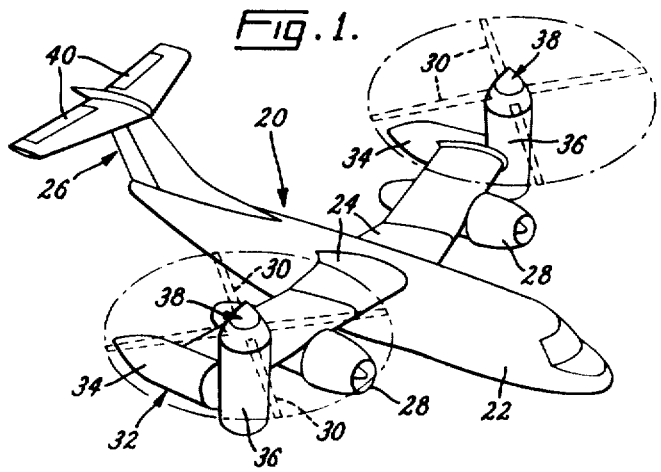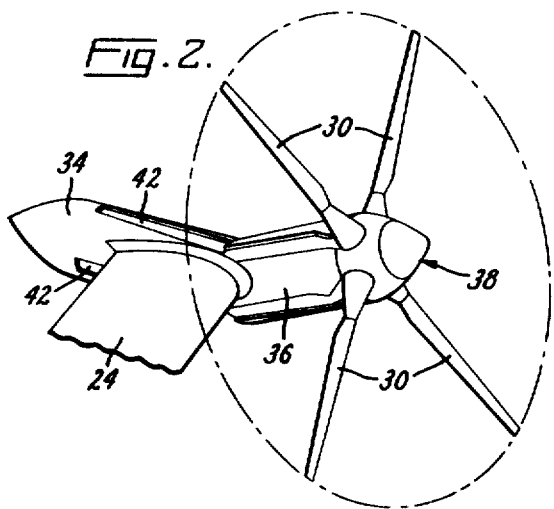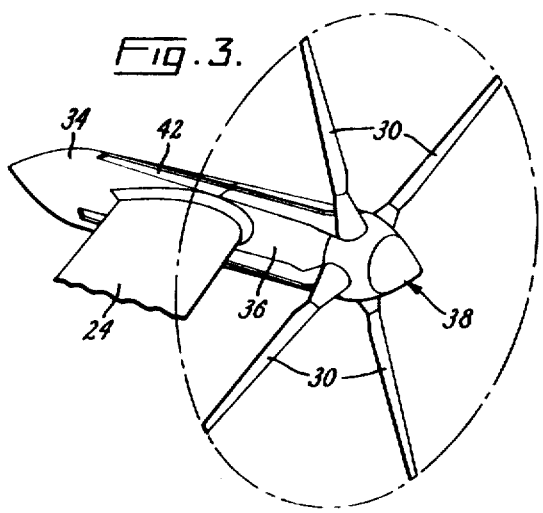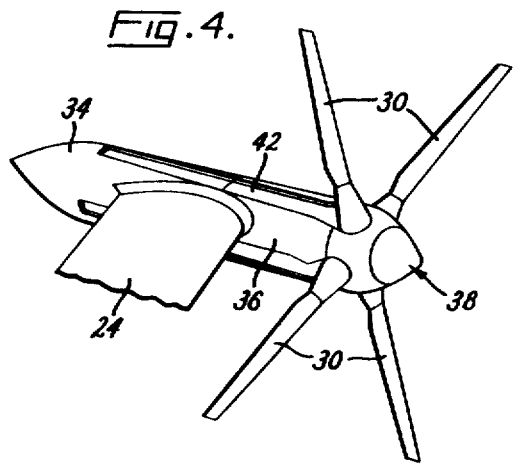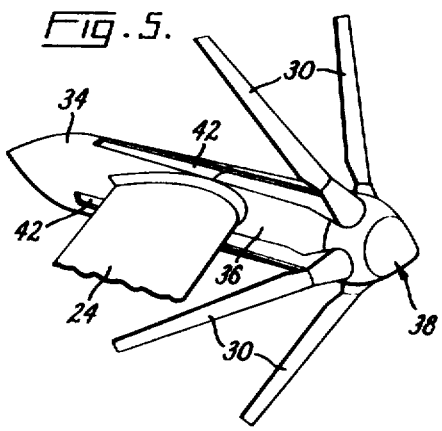

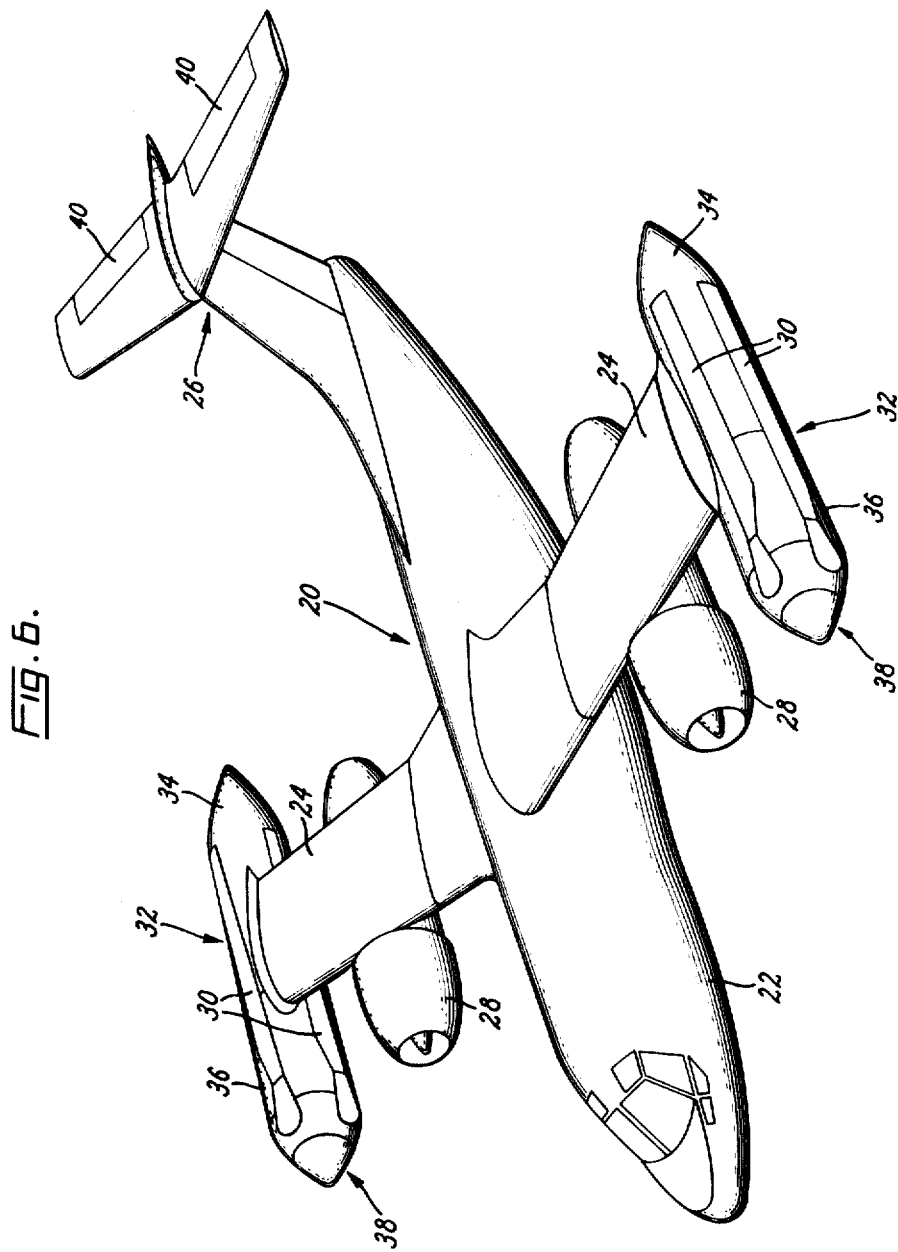

INVENTOR:
EDWARD W. GLATFELTER,
BY Albertus Hiltunger
ATTORNEY

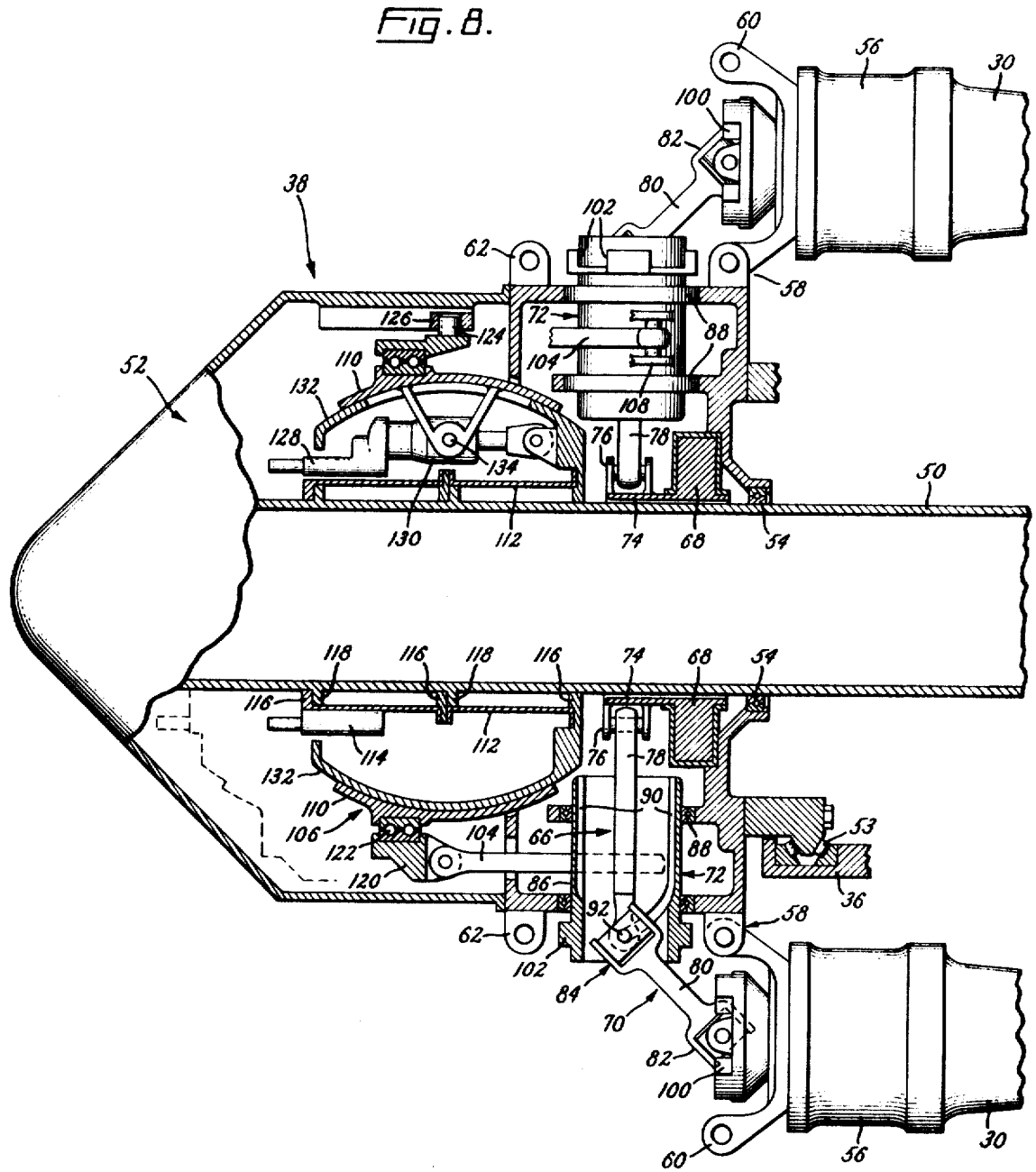

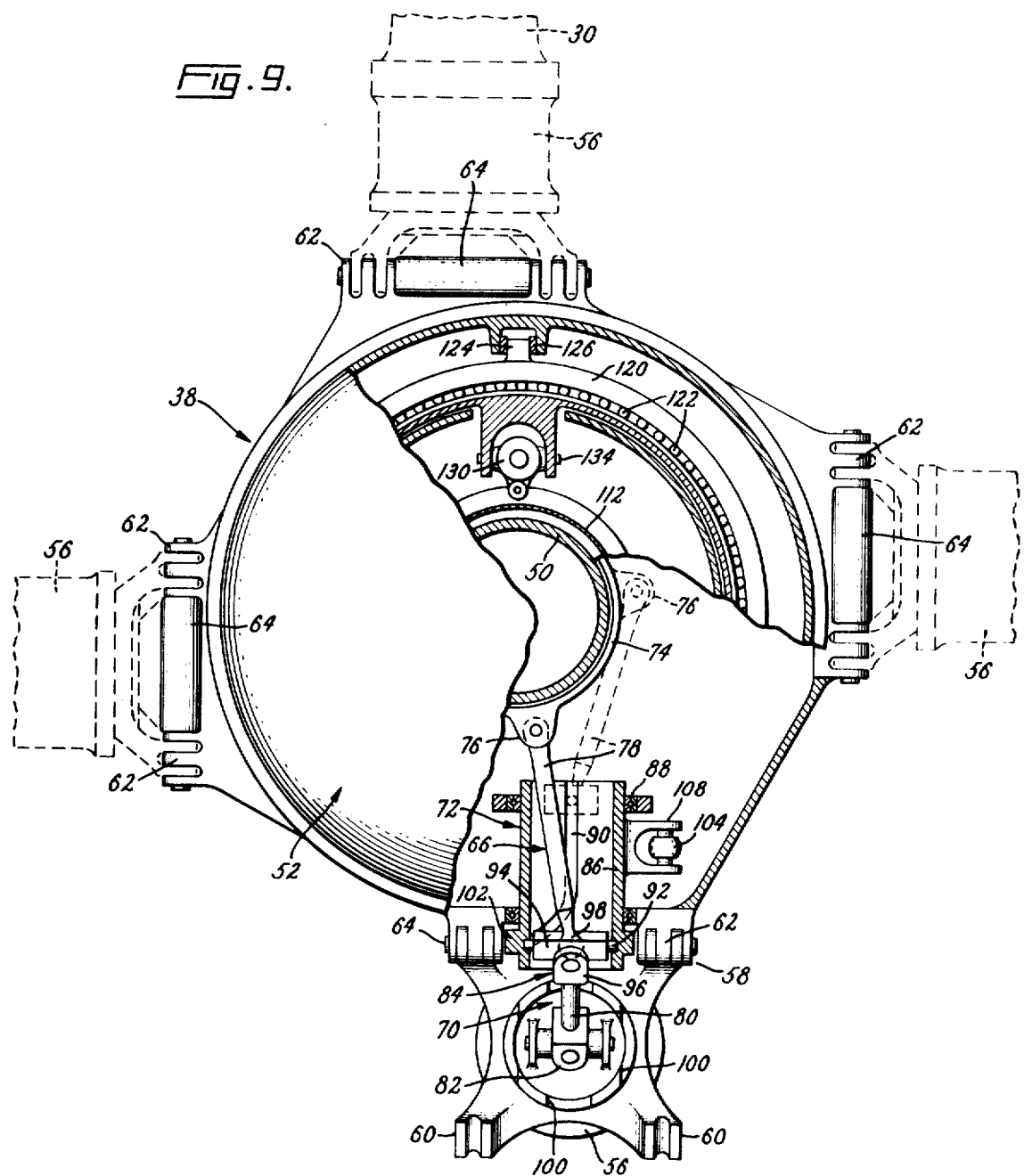

3,592,412

CONVERTIBLE AIRCRAFT

This invention relates to aircraft and, more particularly, to aircraft selectively capable of both fixed wing and rotary wing flight.

During cruise mode operation, convertible aircraft offer features common to conventional fixed-wing airplanes in that they are capable of attaining high speeds while maintaining low levels of vibration. During hover mode operation, convertible aircraft offer features common to helicopters in that they are capable of taking off and landing in spaces too confined for conventional fixed-wing aircraft and even for so-called short takeoff and landing (STOL) aircraft. One typical use for convertible aircraft is in commercial airline operation as a short-to-medium range airliner which would have high speed capability between cities, but would also be capable of landing at center city or suburban heliports. In a typical military role, such an aircraft would be employed to retrieve friendly personnel from locations deep within enemy territory. For the latter purpose, an aircraft must not only be capable of flying at high speeds across enemy territory, but also capable of operation in the hover mode to perform the retrieval operation. A variety of other uses for convertible aircraft can be readily envisioned.

Various types and configurations of convertible aircraft have been considered including tilt-wing, tilt-rotor, and folding tilt-rotor aircraft. The present invention is directed toward a folding tilt-rotor aircraft which incorporates the features of both tilt-wing and tilt-rotor aircraft, while largely eliminating their disadvantages. While slightly more complex than typical tilt-wing and tilt-rotor configurations, the folding tilt-rotor aircraft disclosed herein has excellent lift and speed capabilities with a minimum of downwash, that is, air velocity directed downwardly by the rotor blades during hover mode operation. Moreover, the aircraft's payload fraction, that is, payload taken as a percentage of gross weight, either during the vertical takeoff and landing (VTOL) mode, or during the STOL mode, is very promising.

In the aircraft disclosed herein, the contour of the rotor blades is optimized for hover mode operation, since the rotor blades are folded and inoperative during cruise mode operation when propulsion is otherwise provided. As contemplated by this invention, power is continuously provided by suitable power plants such as convertible cruise fan engines which can be selectively coupled to the rotor blades for hover mode operation or which can be decoupled from the rotor blades and operated to propel the aircraft by means of pure thrust. In a sequence of events, the aircraft progresses from a hover mode, during which blades rotating in a substantially horizontal plane enable it to hover, climb, and descend like a helicopter, through a transition mode during which the plane of the rotating blades changes from a substantially horizontal disposition to a substantially vertical disposition. When the plane of the blades achieves the latter disposition, a conversion mode is reached during which the blades are suitably uncoupled from the power plants, stopped with the aid of aerodynamic forces, rotated about their pitch axes to a substantially feathered position, and suitably locked in position. After the blades are folded, the aircraft is accelerated by other means such as the thrust from the fan engines.

The blades are movable between extended, operational positions and retracted, inoperative positions flush with the outer surface of their associated nacelles respectively mounted at outer extremities of fixed wings of the aircraft. Thus, when the rotor hub is brought to a stop by aerodynamic forces, and each blade is properly positioned in line with an appropriate cavity provided in its associated nacelle, the folding sequence is begun. For this purpose, a scheduling mechanism controls rotation of the blade about its pitch axis as the blade is folded toward its retracted position. This scheduling mechanism maintains the blade in its feathered position until such time that the blade is nearly retracted, at which time the blade is rapidly rotated about its pitch axis to a substantially flat pitch as it nests into its associated cavity.

The blades are maintained in their feathered positions for as large a portion of the fold angle as possible during the folding sequence in order to reduce the aerodynamic loads or flat-plate drag. Also, the blades are laid flat against the nacelle so as to provide a minimum wetted area, that is, area exposed to the slip stream, thereby resulting in a minimum of drag. Aerodynamic forces are also employed to commence rotation of the deployed rotor blades when the aircraft converts from the cruise mode to the hover mode. Full advantage is thus taken of the aerodynamic forces, thereby eliminating any need for heavy transmission clutches or stopping brakes.

Of course, it will be understood that the aircraft presently disclosed is capable of conventional take offs and landings.

Accordingly, it is an object of the invention to provide a new and improved convertible aircraft.

Another object of the invention is to provide a new and improved convertible aircraft utilizing a stoppable rotor which incorporates rotor blades movable between extended, operational positions and retracted, inoperative positions.

Yet another object of the invention is the provision of a convertible aircraft having retractable rotor blades which remain substantially feathered during the folding sequence but which move rapidly to flat pitch when they are nearly retracted.

A further object of the invention is the provision of a rotor hub assembly for a convertible aircraft including a rotor blade mounted for movement about first and second transverse axes and an operative mechanism responsive to movement of the blade about the second axis for moving the airfoil about the first axis.

Other and further objects and advantages of the invention will be obvious or will be made apparent in the course of the description of the invention which follows, taken together with the accompanying drawings.

In the drawings:

FIG. 1 is a perspective view of a convertible aircraft embodying the invention and depicting the aircraft in the hover mode;

FIG. 2 is a detailed perspective view of a portion of the aircraft shown in FIG. 1 and illustrating a rotor hub assembly during the transition mode;

Figure 7:
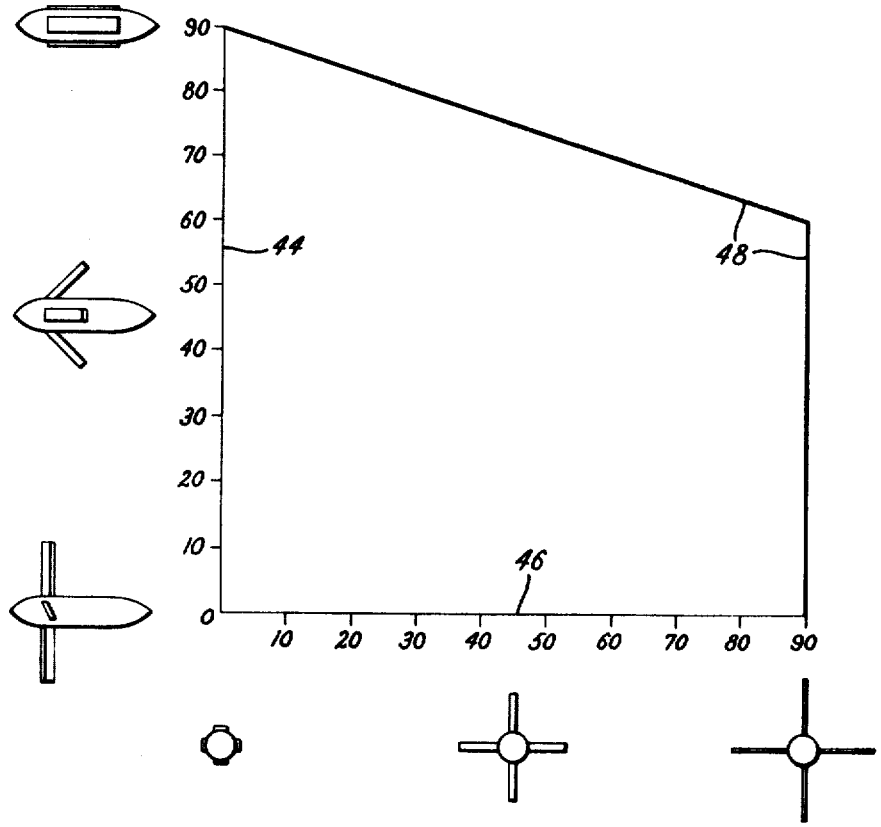
Figure 10:
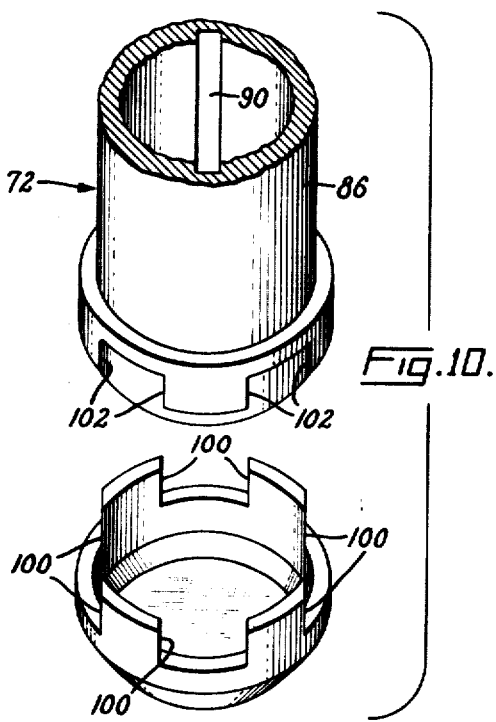

FIGS. 3, 4, and 5 are views similar to FIG. 2 illustrating the rotor hub assembly during the conversion mode and depicting, respectively, the rotor stopping stage, the feathering stage, and the folding stage;

FIG. 6 is a perspective view showing the convertible aircraft in the cruise mode;

FIG. 7 is a graph schematically depicting progressive change of pitch angle versus change of fold angle for the rotor blades;

FIG. 8 is a detail side elevation view, partly in section, of a mechanism for folding the blades and depicting the blades in their folded positions;

FIG. 9 is a front elevation view, partly in section, of the mechanism shown in FIG. 8, schematically depicting, with dotted lines, three of the blades in their extended positions and, with solid lines, a fourth blade in its folded position; and FIG. 10 is a perspective view of a mechanism for coupling a blade to the pitch change mechanism when the blade is in the extended position.

Refer now to the drawings and initially to FIG. 1, in which a convertible aircraft 20 embodying the invention is depicted in the hover mode. The aircraft 20 resembles a conventional airplane in that it includes a fuselage 22, wings 24, a tail assembly 26, and a plurality of power plants 28. The power plants 28 may be any suitable type, but preferably are convertible turbofan engines capable, selectively, of propelling the aircraft by means of pure thrust or by being mechanically coupled to suitable lifting elements 30. A pair of nacelle assemblies 32 for the lifting elements 30 are mounted at extremities of the wings 24 or at least sufficiently spaced from the fuselage 22 that the lifting elements clear the fuselage as they whirl. Each nacelle assembly 32 includes an aft structure 34 fixed to the wing 24 and a forward structure 36 pivotally mounted on the aft structure for movement from a substantially vertical disposition (FIG. 1), through intermediate dispositions (FIG. 2), to a substantially horizontal disposition (FIG. 3) relative to the wing 28. When a longitudinal axis of the forward structure 36 is substantially perpendicular to that of the aft structure 34 and to a plane of the wing 24 (FIG. 1), planes respectively defined by the lifting elements 30 are disposed substantially horizontally and the aircraft 20 is said to be in the hover mode. The lifting elements 30 may take the form of aerodynamically contoured airfoils or blades or other suitable lifting devices mounted on a rotatable rotor hub assembly 38 adjacent an extremity of the forward structure 36. Throughout the present specification, including claims, any reference to airfoils or blades is intended to include all suitable lifting devices.

Suitable shafting (not shown) is employed to drivingly couple the power plants 28 to the rotor hub assembly 38 whenever it is appropriate to rotate the hub assembly and its associated blades 30. For flight safety reasons, the power plants 28 and the rotor hub assembly 38 on the starboard side of the aircraft 20 are preferably drivingly coupled with those on the port side of the aircraft, such that in the event of a failure of one of the power plants, the remaining power plant can maintain partial power to both of the hub assemblies 38.

In the hover mode of operation depicted in FIG. 1, the power plants 28 provide a minimum of forward thrust to the aircraft, but serve primarily to drive the hub assemblies and their associated blades 30. However, when the aircraft 20 attains a sufficient altitude and it is desired to convert from the hover mode to the cruise mode and thus enable the aircraft to fly in the manner of a conventional fixed-wing airplane, the forward structure 36 is suitably pivoted relative to the aft structure 34 through the position illustrated in FIG. 2 to the position indicated in FIG. 3. During this operation, the aircraft 20 is said to be in the transition mode. In the hover mode, cyclic pitch of the blades 30 is controlled to maintain stability of the aircraft 20 about a transversely directed or pitch axis. However, during transition, cyclic pitch control is gradually reduced and, simultaneously, elevators 40 on the tail assembly 26 become gradually more effective as cyclic pitch control becomes less effective. Increased effectiveness of the elevators 40 occurs with increased forward speed of the aircraft 20 and the resultant flow of air across the surfaces of the tail assembly 26. When the forward structure 36 attains the position depicted in FIG. 3, cyclic pitch is no longer applied to the blades 30 and control of the aircraft 20 about the pitch axis results entirely by operation of the elevators 40.

FIGS. 3, 4, and 5 illustrate successive positions or stages which the rotor blades 30 assume during the conversion mode. Specifically, these successive stages occur when the source of forward motion for the aircraft 20 is being gradually transferred from the blades 30 to the power plants 28 in their capacity of powering the aircraft 20 solely by pure horizontal thrust. During the stage illustrated in FIG. 3, the blades 30 are suitably moved to an optimum pitch whereby aerodynamic forces operating on them by reason of the forward motion of the aircraft 20 serves to slow the rotation of the hub assembly 38 and eventually bring it to a stop. When this occurs, the blades 30 are suitably feathered so as to achieve minimal air resistance. The hub assembly 38 is preferably stopped such that each blade 30 is positioned coincident with a suitable cavity 42 provided in an outer surface of its associated nacelle assembly 32. Each cavity 42 is adapted to receive a blade 30 in a nestling relationship when the blades are folded. Thereupon, the blades 30 are folded back toward the cavities 42 (FIG. 5) until they assume inoperative positions within the cavities such that outer surfaces of the blades 30 lie flush with the outer surfaces of the nacelle assembly 32.

It will be appreciated that, in order for each blade 30 to convert from an extended position in the feathered condition (FIG. 4) to the folded or retracted position flush with the outer surface of the nacelle assembly (FIG. 6), the blade must rotate approximately 90° about its own pitch or longitudinal axis. This operation can more readily be understood with reference to FIG. 7 which is a graph representing blade fold angle, in degrees, along an ordinate 44, and blade pitch angle, in degrees, along an abscissa 46, and a preferred sequence 48 of change of blade pitch angle as the blade fold angle changes. From an examination of the preferred sequence 48 in FIG. 7, it can be seen that the blades 30 remain substantially feathered until they have been folded back approximately 60°, at which state, blade pitch angle begins to be reduced substantially linearly with respect to fold angle. By delaying pitch change of the blades 30 until they have reached approximately 60° of complete fold, the flat-plate drag and the resultant aerodynamic loads on the aircraft 20 and on the blades themselves is substantially decreased from what it would be were pitch change to occur immediately upon commencement of and proportionately with the folding operation.

Turn now to FIGS. 8 and 9 for a detailed description of the rotor hub assembly 38 upon which the rotor blades 30 are mounted and which includes a mechanism suitable for controlling operation of the blades in the manner just described. The rotor hub assembly 38 includes a stationary stack 50 which is integral with the forward structure 36 and substantially cylindrical at least in the region of a rotor hub 52. The rotor hub 52 is rotatably mounted on the forward structure 36 by means of a suitable bearing 53 and is centered relative to the stack 50 by means of support bearings 54.

The inboard end of each blade 30 is suitably supported in a retention member 56 which permits rotation of the blade about a pitch or first axis. A hinge 58 pivotally mounts the retention member 56 on the rotor hub 52 permitting movement of the blade 30 about a second or fold axis such that the blade is movable between a retracted position nestled in the cavity 42 (FIG. 6) and an extended or operative position (FIG. 4). When the blade 30 is moved to the extended or operative position, lugs 60 on the blade retention member 56 diametrically opposite the hinge 58 interdigitally engage with similar lugs 62 integral with the rotor hub 52 and a locking pin 64 (FIG. 9) is suitably extended to interconnect the lugs 60 and 62.

In order to move the blade 30 between retracted and extended positions, an operative mechanism 66 is employed which includes an actuator 68, a linkage 70, and a scheduling mechanism 72. The actuator 68 may be, for example, a rotary hydraulic device mounted on the rotor hub 52 concentric with the stack 50 and including an actuator plate 74 having a plurality of ears 76, one corresponding with each of the blades 30. The linkage 70 serves to connect each ear with the inboard end of each blade 30 and includes an inner link 78 and an outer link 80. The inner link 78 is pivotally connected to its associated ear 76 and the outer link is pivotally connected by a universal joint 82 to the inboard end of its associated blade, and the links 78 and 80 are suitably connected by a joint 84.

As seen in FIGS. 8 and 9, the joint 84 cooperates with the scheduling mechanism 72 to control rotational movement of the blade 30 about its pitch axis as the blade is being moved between its extended and retracted positions. The scheduling mechanism 72 includes a sleeve 86 which is radially disposed relative to the stack 50 and mounted by bearings 88 on the rotor hub 52 for rotational movement about a longitudinal axis. A pair of cam slots 90 are provided in the inner surface of the sleeve 86 and these slots are engaged by cam follower pins 92 integral with the joint 84. In the embodiment shown, which serves merely as an example, the joint 84 includes a socket 94 pivotally mounted on a yoke 96 at an extremity of the outer link 80 distant from the inboard end of the blade 30. The cam follower pins 92 are fixed adjacent opposite ends of the socket 94. A ball 98 at the outer end of the inner link distant from the actuator plate 74 is received in the socket 94 to permit swiveling movement between the inner link 78 and the outer link 80 while assuring their unitary motion in tension and compression.

Thus, as the actuator 68 is operated to rotate the actuator plate 74 in a counterclockwise direction (FIG. 9) such that the linkage 70 is drawn by the ear 76 from the position shown in FIG. 6 to that shown in FIG. 4, the cam follower pins 92 of the joint 84 are slaved to follow the contour of the cam slots 90, with the result that the outer link 80 is rotated about its longitudinal axis and, via the universal joint 82, causes rotation of the blade 30 about its pitch axis. The cam slots 90 can be contoured to provide the scheduled movement of the blade 30 suggested in FIG. 7 or they may be contoured to provide any other desired movement of the blade about its pitch axis as it is being moved between the retracted and extended positions. Thus, the actuator plate 74 serves to provide positive synchronous movement of all the blades 30 mounted on the hub 52 resulting from the operation of a single actuator.

When each blade 30 is in an extended or operative position, coupling surfaces 100 (FIG. 9) on the inboard end of the blade are matingly engaged with similar coupling surfaces 102 on an outer end of the sleeve 86. When the coupling surfaces 100 and 102 are matingly engaged, the sleeve 86 and the blade 30 are rotatable as a unit. The details of this construction is now clearly shown in FIG. 10.

When the blades 30 are retracted (FIG. 8), pitch links 104 extending between a swashplate mechanism 106 and radially extending lobes 108 (FIG. 9) on the sleeve 86 maintain the sleeve in the position indicated in FIG. 8 during operations for retracting and extending the blades.

The swashplate mechanism 106 includes a nonrotatable swashplate 110 which is axially movable along the stationary stack 50 by a collective pitch actuator 112 and its associated servo valve 114. The swashplate mechanism 106 can be moved within the limits defined, respectively, by annular flanges 116 at opposite ends of the collective pitch actuator 112 and spaced rings 118 integral with the stationary stack. As the collective pitch actuator 112 is operated to move the nonrotatable swashplate 110 axially along the stack 50, it similarly drives a rotatable swashplate 120 for controlling pitch of the blades 30 through the sleeve 86. The rotatable swashplate 120 is rotatably mounted on the nonrotatable swashplate 110 by means of bearings 122 and is slidingly engaged by means of a drive lug 124 with an axially directed drive slot 126 integral with the rotor hub 52. Thus, operation of the collective pitch actuator 112 is effective to simultaneously change pitch of all the blades 30 mounted on the rotor hub assembly 38.

To control cyclic pitch of the blades 30, a cyclic servo valve 128 serves to operate a cyclic pitch actuator 130 operable to move the nonrotatable swashplate 110 along an arcuate of a center bearing 132 integral with the collective pitch actuator. With the nonrotatable swashplate 110 pivotally connected as at 134 to the servo valve 128, the plane of the swashplate 110 is tilted relative to a diametrical plane of the stationary stack 50 whereby the blades 30 mounted on the rotor hub assembly 38 assume, in azimuth, successively different pitch angles.

In operation, the aircraft 20 is able to take off in a substantially vertical direction with the plane of the blades 30 substantially horizontal as shown in FIG. 1. The rate of ascent can be controlled by operating the collective pitch actuator 112 to vary the collective pitch of the blades 30. While the aircraft remains in the hover mode, the cyclic servo valve 128 is also operated to adjust the cyclic pitch of the blades 30 to thereby maintain stability of the aircraft about a lateral axis. However, in the course of transition (FIG. 2) as the aircraft begins to accelerate in its forward direction, operation of the cyclic servo valve 128 is gradually decreased and the elevators 40 gradually become more effective to ensure longitudinal stability of the aircraft. At such time as the plane of the blades 30 substantially attains a vertical orientation, the rotor hub 52 is suitably uncoupled from the power plants 28 and the power plants suitably converted for cruise operation. Simultaneously, the collective pitch actuator 112 is operated by the servo valve 114 to suitably position the blades about their pitch axes so as to utilize the aerodynamic forces available by reason of the forward motion of the aircraft 20 to bring the airfoils to a stop. The blades 30 are thereupon suitably braked to a stop and moved into a feathered position by operation of the collective pitch actuator 112. With each blade positioned coincident with its associated cavity 42 in the nacelle assembly 32, the locking pins 64 are withdrawn and the blade fold actuator 68 is operated to rotate the actuator plate 74 in a clockwise direction (FIG. 9) such that the inner link 78 moves from the dotted line position to the solid line position. In this manner, the linkage 70 is extended and the blade is pivoted for movement about the hinge 58. As the blade 30 approaches the folded position within the cavity 42, it is rotated about its pitch axis by reason of the cam follower pins 92 following the cam slots 90 in the pitch control sleeve 86. When the blade fold actuator 68 has reached its terminal position, as represented by the position of the ear 76 in FIG. 9, all of the blades 30 associated with the rotor hub assembly 38 will have nestled in its associated cavity 42 with one surface substantially flush with the outer surface of the nacelle assembly 32.

Similarly, when the aircraft 20 approaches a landing site and it is desired to land the aircraft like a helicopter, the blade fold actuator 68 is operated to rotate the actuator plate 74 in a counterclockwise direction (FIG. 9), thereby moving the blades 30 from their retracted positions toward their extended positions. When the blades 30 have achieved a fully extended position (FIG. 9), the collective servo valve 114 suitably operates the collective pitch actuator 112 to move the blades to a suitable pitch angle at which the aerodynamic forces acting on the blades by reason of the forward motion of the aircraft 20 are effective to initiate rotation of the blades. When the rotor hub assembly 38 attains a predetermined rotational speed, the assembly is suitably coupled to the power plants 28. Thereupon, the forward structure 36 is pivotally moved relative to the aft structure 34 as the aircraft 20 passes through the transition mode (FIG. 2) and finally attains the hover mode (FIG. 1) enabling the aircraft to land in the manner of a helicopter.

What I claim is:

1. A rotor hub assembly comprising: a rotatable hub member, lifting means, a hinge mounting said lifting means on said hub member for pivotal movement about a fold axis between a retracted and an extended position, a bearing mounting said lifting means on said hub member for rotation about a pitch axis, and operative means including an actuator and linkage connecting said actuator to said lifting means for moving said lifting means between said retracted position and said extended position and a scheduling mechanism for controlling rotational movement of said lifting means about said pitch axis in accordance with movement of said lifting means about said fold axis.

2. A rotor hub assembly as set forth in claim 1 wherein said scheduling mechanism includes a cam mounted on said hub member and a cam follower engaged with said cam and mounted on said linkage, said cam being contoured to provide scheduled rotational movement of said lifting means about said first axis in response to movement of said lifting means about said second axis between said retracted and extended positions.

3. A rotor hub assembly as set forth in claim 2 wherein said linkage includes an inner link pivotally connected to said actuator, an outer link pivotally connected to said lifting means and adapted to impart rotational movement thereto about said first axis, and a joint coupling said inner link to said cam follower with rotational freedom therebetween and universally coupling said outer link to said cam follower.

4. A rotor hub assembly as set forth in claim 3 wherein said scheduling mechanism has an outer end and said lifting means has an inboard end, said ends respectively including coupling surfaces which are drivingly engaged when said lifting means is in said extended position.

5. A rotor hub assembly as set forth in claim 1 wherein said operative means includes a pitch control member mounted on said hub member for rotation about a third axis, and coupling means drivingly engaging said lifting means and said pitch control member when said lifting means is in said extended position such that said pitch and third axes are substantially coincident, and a swashplate movably mounted on said hub member and a pitch link connecting said swashplate to said pitch control member such that movement of said swashplate results in movement of said pitch control member about said third axis and in rotation of said lifting means about said pitch axis.

6. A rotor hub assembly as set forth in claim 1 wherein said lifting means includes a plurality of lifting elements each mounted on said hub member for movement about said fold axis between a retracted and an extended position, and said operative means includes an actuator and a linkage connecting said actuator to each of said lifting elements for simultaneously moving all of said lifting elements between their retracted positions and their extended positions.

7. A rotor hub assembly as set forth in claim 6 wherein said operative means includes a scheduling mechanism associated with each of said lifting elements for controlling rotational movement thereof about said first axis in accordance with movement of each of said lifting elements about said second axis.

8. A rotor hub assembly as set forth in claim 7 wherein each said scheduling mechanism includes a cam mounted on said hub member and a cam follower engaged with said cam and mounted on said linkage, said cam being contoured to provide scheduled rotational movement of its associated said lifting element about said second axis between said retracted and extended positions.

9. A rotor hub assembly as set forth in claim 8 wherein each said linkage includes an inner link pivotally connected to said actuator, an outer link pivotally connected to its associated said lifting element and adapted to impart rotational movement thereto about said first axis, and a joint coupling said inner link to said cam follower with rotational freedom therebetween and universally coupling said outer link to said cam follower.

10. A rotor hub assembly as set forth in claim 9 wherein each said scheduling device has an outer end and its associated said lifting element has an inboard end, said ends respectively including coupling surfaces which are drivingly engaged when said lifting element is in said extended position.

11. A rotor hub assembly as set forth in claim 10 including a stationary stack for rotatably mounting said hub member, said stack being substantially circular in cross section and said actuator being concentric with said stack, each said inner link extending substantially radially from said stack and each said outer link extending transversely of said inner link when said lifting elements are in said retracted positions, each said inner link positioned substantially tangent to said stack and said outer link being substantially concentric with said sleeve when said lifting elements are in said extended positions.

12. A rotor hub assembly comprising:
a stationary stack,
a hub member rotatably mounted on said stack;
lifting means having a transverse axis;
a bearing mounting said lifting means on said hub member for rotation about said transverse axis;
a hinge mounting said lifting means on said hub for pivotal movement between extended and retracted positions;
an actuator on said hub member for moving said lifting means between said extended and retracted positions;
a sleeve radially mounted on said hub member and having inner and outer ends and a cam integral therewith;
a cam follower engageable with said cam and movable between said inner and outer ends;
an inner link pivotally connected to said actuator;
an outer link pivotally connected to said lifting means and adapted to impart rotational movement thereto about said first axis;
a joint coupling said inner link to said cam follower with rotational freedom therebetween and universally coupling said outer link to said cam follower;
said cam being contoured such that said cam follower provides scheduled rotational movement of said lifting means about said pitch axis through said outer link as said lifting means moves from said retracted position toward said extended position and as said cam follower moves from said outer end toward said inner end.

13. A rotor hub assembly as set forth in claim 12 wherein said lifting means includes an inboard end, said outer end of said sleeve and said inboard end of said lifting means, respectively, including mating coupling surfaces which are drivingly engaged when said lifting means is in said extended position.

14. A rotor hub assembly as set forth in claim 13 wherein said stack is substantially circular in cross section and said actuator is concentric with said stack, said inner link extending substantially radially from said stack and said outer link extending transversely of said sleeve when said lifting means is in said retracted position, said inner link positioned substantially tangent to said stack and said outer link being substantially concentric with said sleeve when said lifting means is in said extended position.

15. A rotor hub assembly as set forth in claim 14 wherein said stack is substantially cylindrical and including a swashplate movable on said stack and a pitch link connecting said swashplate to said sleeve for rotating said lifting means about said pitch axis upon movement of said swashplate on said stack.